UNITED STATES PATENT OFFICE.

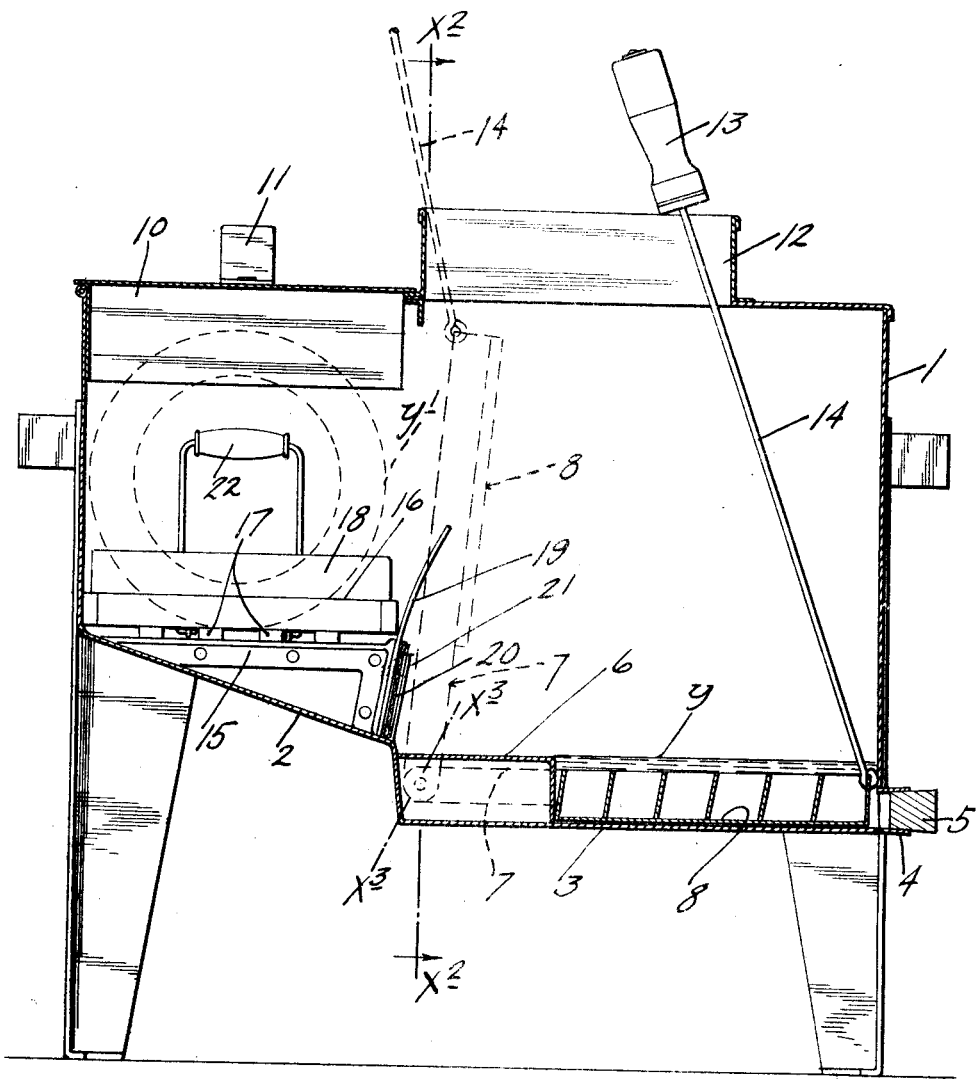

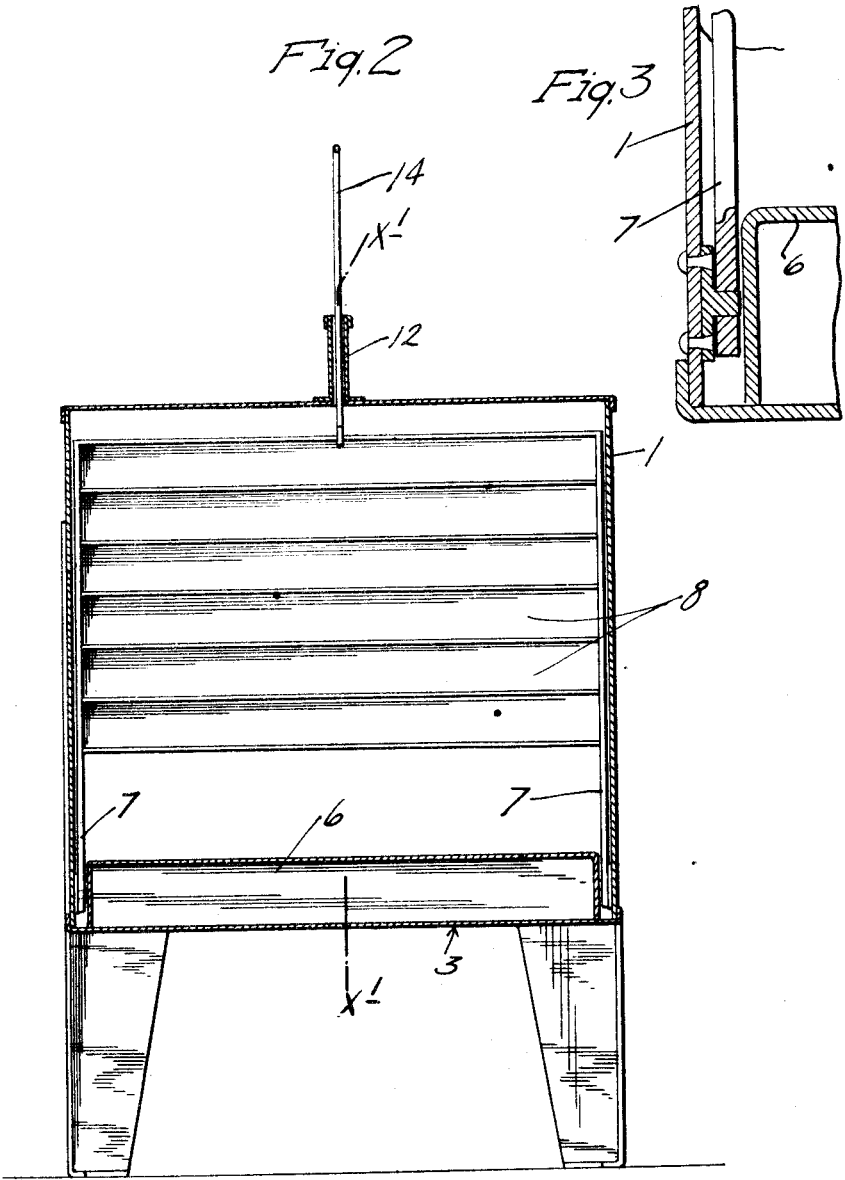

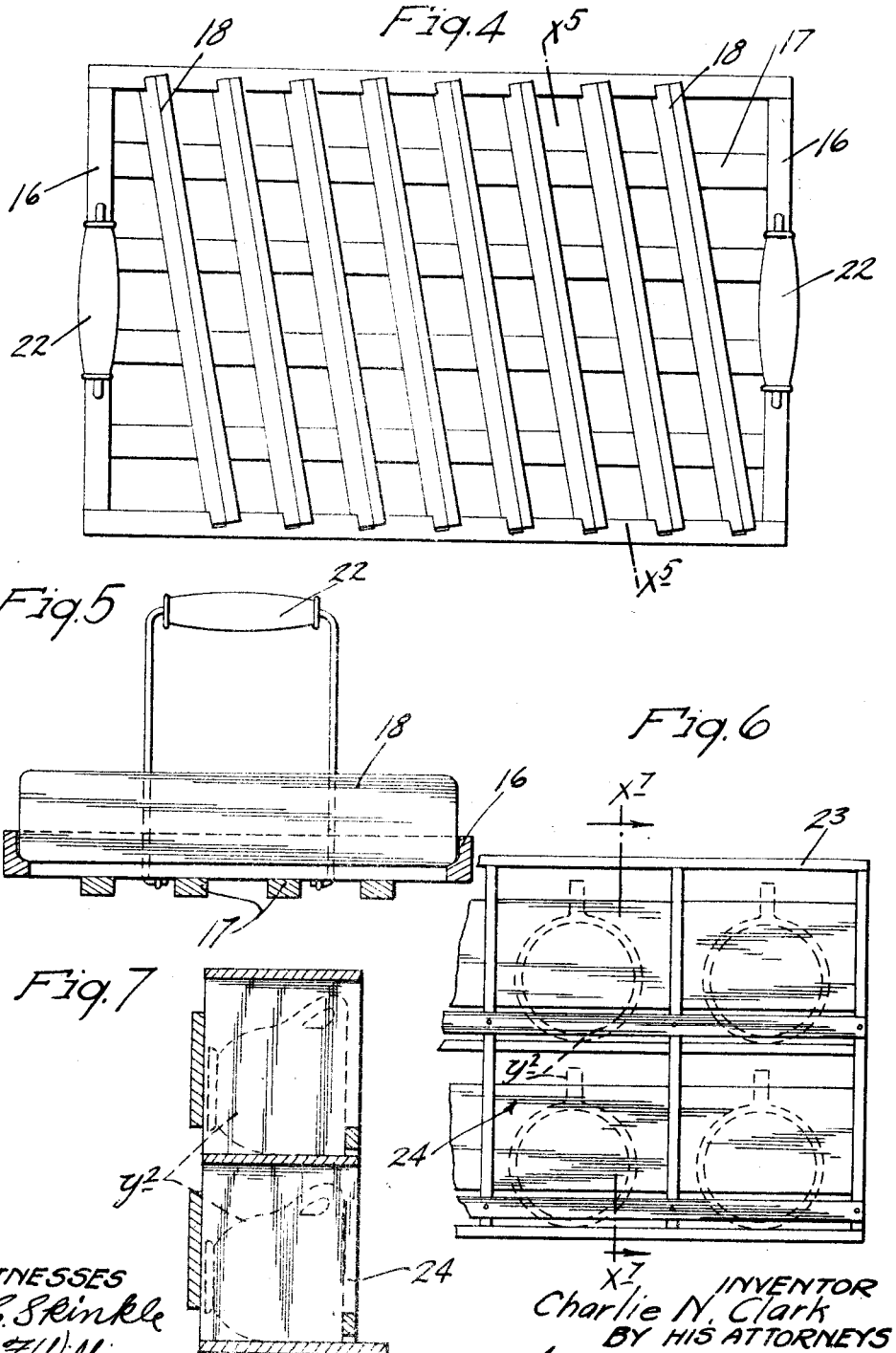

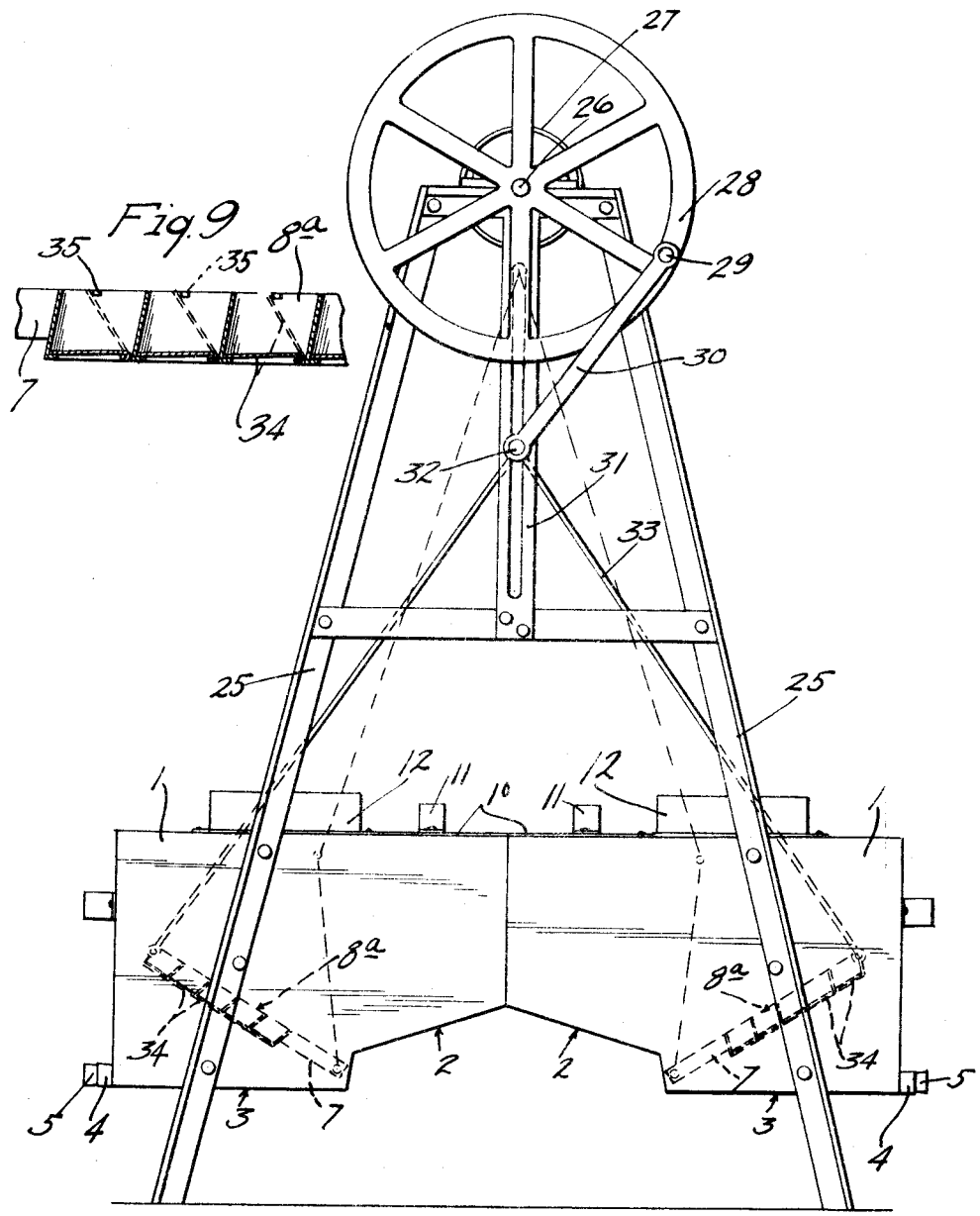

CHARLIE N. CLARK, OF MINNEAPOLIS, MINNESOTA, ASSIGNOR TO TWIN CITY DISH WASHER COMPANY, OF MINNEAPOLIS, MINNESOTA, A CORPORATION OF MINNESOTA.

DISH-WASHING MACHINE.

1,175,340.   Specification of Letters Patent.   Patented Mar. 14, 1916.

Application filed September 24, 1915. Serial No. 52,437.

*To all whom it may concern:*

Be it known that I, CHARLIE N. CLARK, a citizen of the United States, residing at Minneapolis, in the county of Hennepin and State of Minnesota, have invented certain new and useful Improvements in Dish-Washing Machines; and I do hereby declare the following to be a full, clear, and exact description of the invention, such as will enable others skilled in the art to which it appertains to make and use the same.

My invention has for its object to provide an extremely simple and highly efficient dish washing machine; and to such ends, generally stated, the invention consists of the novel devices and combinations of devices hereinafter described and defined in the claims.

This improved dish washer is efficient, when made of the proper size, for washing dishes in hotels and restaurants, but is of such a character that it is especially well adapted, when made in smaller sizes, for use as a dish washer in the family kitchen.

In the accompanying drawings which illustrate the invention, like characters indicate like parts throughout the several views.

Referring to the drawings: Figure 1 is a vertical section taken longitudinally through the improved dish washing machine on the line $x^1$ $x^1$ of Fig. 2; Fig. 2 is a transverse section taken on the line $x^2$ $x^2$ of Fig. 1; Fig. 3 is a detail taken in section, approximately on the line $x^3$ $x^3$ of Fig. 1; Fig. 4 is a plan view showing a tray for holding dishes; Fig. 5 is a transverse section taken on the line $x^5$ $x^5$ of Fig. 4; Fig. 6 is an elevation with some parts broken away, showing a rack or tray for holding cups and the like; Fig. 7 is a section taken on the line $x^7$ $x^7$ of Fig. 6; Fig. 8 is a side elevation showing a duplex arrangement of the dish washing machine and power connections for driving the same; and Fig. 9 is a fragmentary view in vertical section, showing the form of the so-called water dasher, preferably used in connection with the power machine.

Referring first to the construction shown in Figs. 1 to 7, inclusive, the numeral 1 indicates a tank, preferably made of galvanized sheet metal approximately rectangular in horizontal cross section, but in its bottom having an inclined section 2 and a depressed section 3, which latter is adapted to contain the water approximately to a level indicated at $y$ on Fig. 1. This lower portion 3 has a drain port 4 shown as normally closed by a stopper 5.

The numeral 6 indicates a box-like structure secured on the depressed bottom 3 adjacent to the lower portion of the inclined bottom section 2, but spaced from the sides of the tank, as best shown in Fig. 2, to afford clearance for the laterally spaced arms 7 of a so-called water dasher, the bottom of which is in the form of a rectangular pan 8 having a multiplicity of compartments formed between transverse partitions. The said pan portion 8 of the dasher, it will be noted, normally lies on the depressed bottom 3 with its upper portion slightly below the normal water level $y$, so that its compartments will be filled with water.

That portion of the top of the tank 1 which directly overlies the inclined bottom section 2, is in the form of a removable cover 10 shown as provided with a suitable hand piece 11, by means of which it may be readily removed and applied. That portion of the top of the tank 1 which overlies the depressed bottom 3 and is midway between the sides of the tank, is provided with a longitudinal channel, preferably formed in a raised sheet metal guide 12.

In the hand-operated machine, the dasher 8 is arranged to be operated by a hand piece 13 having a stem or rod 14 that works freely in the guide 12, and at its lower end, is pivotally attached to the free edge flange of the pan 8. Here it may be stated that the box-like section 6 is used simply for the purpose of reducing the amount of water that must be contained in the tank in order to insure filling of the compartments of the dasher 8.

Rigidly secured to the sides of the tank 1, just above the inclined bottom 2, are tray supporting brackets 15, the upper surfaces of which are level and project inward from the sides of the tank, so that they are adapted to support holding trays, such as shown in Figs. 4 to 7, inclusive, for example.

The dish supporting tray shown in Figs. 4 and 5, comprises a rectangular marginal frame 16 having permanent longitudinal slats 17 and removable obliquely set transverse spacing bars 18, the ends of which latter are seated in notches cut in the side bars of the frame 16. The dishes are adapted to be held between the spacing bars 18. For ordinary dishes, the slats would all be applied as shown in Fig. 4, but for deeper dishes, one or more of the said spacing bars may be removed. It is important to note that the said spacing bars 18 are set transversely oblique to the sides of the tray and are also tilted backward in respect to the vertical. This is important, because when the tray is applied on the supporting brackets 15, as shown in Fig. 1, the dishes $y^1$, indicated by dotted lines in Fig. 1, will be tilted and set oblique to the longitudinal axis of the tank, so that when water is thrown against the dishes, as presently described, it will strike the entire concave faces of the dishes, and hence, insure clean washing thereof.

The washing action is produced by giving the dasher 8 a sudden or violent upward movement from its full line into its dotted line position in Fig. 1, and under such movement, the water will be thrown violently against the dishes. To stop the upward movement of the dasher with a cushioned action, buffer springs 19, preferably of the leaf spring type, are secured at their lower ends to the supporting brackets 15 with their free upper ends in position to engage the side bars or legs 7 of the dasher.

To hold back the solid particles washed from the dishes, a strainer in the form of a wire screen plate 20 is placed on the lower portion of the inclined deck or bottom section 2 and is extended from side to side of the tank. Preferably, this strainer or straining partition 20, at its ends, is detachably seated in channel-shaped keepers 21 secured on the sides of the tank and to the ends of the brackets 15. The tray 16, at its ends, is shown as provided with bail-like handles 22, by means of which it may be readily lifted to and from working position and carried from place to place with its load of dishes.

In Figs. 6 and 7, I have shown a rack or tray for holding cups $y^2$. This rack, which is indicated, as an entirety, by the numeral 23, is made up of horizontally spaced boards, end plates and connecting bars or slats interposed to afford entrance passages 24, through which the cups may be inserted and removed. This rack, like the dish supporting rack, is adapted to be placed on the supporting brackets 15 with the open faces of the cups exposed to the direct dashing action of the water thrown up by the dasher.

As is evident, the improved dish washer will operate with a very small amount of hot water, inasmuch as it requires only a little more than enough to cover the so-called dasher when it is in its normal or lowered position. This is a feature of especially great importance for a dish washer designed for ordinary kitchen use where the number of dishes to be washed is comparatively small.

For hotel and restaurant use, the washer may be made in appropriate sizes and they may be connected in duplicate, as shown in Fig. 8, wherein two of the tanks above described are placed, end to end, and are supported by a framework 25. In this framework 25 is a counter shaft 26 which may be driven by a belt, not shown, running over a pulley 27 on the said shaft. This shaft 26 is shown as provided with a combined fly wheel and crank 28, the crank pin 29 of which is connected to the upper end of a crank rod 30, the lower end of which is guided for vertical movements by a slotted bar 31 secured to the framework 25. The lower end of this crank rod 30 is provided with a wrist pin 32 that is connected to the upper ends of two dasher rods 33, that work through the slotted guides 12 of the tanks, and the lower ends of which are connected, one to the free portion of each of the two dashers 8 that work within the said tanks.

In a hand-operated machine, in the operation of the dasher, sufficient time may be allowed for the compartments of the dasher to properly fill with water; but in the power operated machine, where the dashers are given positively timed movements, it is desirable to provide the water containing compartments of the dasher $8^a$ with hinged bottom plates 34 having limited downward movements indicated by full lines in Fig. 9, and having their upward movements limited by stop lugs or lips 35 formed on the sides of the dasher. With the dasher thus constructed, when it is thrown downward into the water, the hinged bottom plates 34 will rise and permit the compartments to quickly fill with water, and under upward movements of the dasher the water will be thrown from the compartments against the dasher, substantially in the same manner as when the dasher is operated by hand. Here it may be noted that the pinions of the dasher are inclined slightly backward to facilitate the discharge of the water when the dasher is brought to a stop against the buffer springs 19.

For the purpose of definition, the compartment in which the tray or trays are applied, is treated as the washing compartment and the receptacle at the bottom of the tank in which the dasher is normally submerged, is treated as the water compartment.

What I claim is:

1. In a washing machine, a tank adapted to contain water and having dish-holding means arranged to support the dishes above the water contained therein, in combination with a dasher in the form of a shallow water receptacle normally resting adjacent to the bottom of said tank, immersed in the water therein contained, and mounted for movements toward and from said dish-holding means.

2. In a washing machine, a tank having a water compartment and a washing compartment, the latter being above the former and arranged to drain back into the same, in combination with a dasher in the form of a shallow water receptacle mounted for pivotal movements toward and from said washing compartment, and normally resting in a submerged position within said water compartment, the said washing compartment having a movable top and tray supporting means.

3. In a washing machine, a tank having a water compartment and a washing compartment, the latter being above the former and arranged to drain back into the same, in combination with a dasher in the form of a shallow water receptacle mounted for pivotal movements toward and from said washing compartment, and normally resting in a submerged position within said water compartment, and a dasher operating device extending through the top of said water compartment.

4. In a washing machine, a tank having a water compartment, and a washing compartment with a bottom leading backward to said water compartment, that portion of the said water compartment below said bottom affording a shallow water receptacle, in combination with a dasher in the form of a shallow water receptacle pivotally mounted adjacent to said washing compartment and normally resting in a submerged position at the bottom of said washing compartment, and means for moving the said dasher upward and toward said washing compartment.

5. In a washing machine, a tank having a water compartment, and a washing compartment with a bottom leading backward to said water compartment, that portion of the said water compartment below said bottom affording a shallow water receptacle, in combination with a dasher in the form of a shallow water receptacle pivotally mounted adjacent to said washing compartment and normally resting in a submerged position at the bottom of said washing compartment, the said dasher having a multiplicity of water compartments opening at the top of the dasher.

6. In a washing machine, a tank having a water compartment, and a washing compartment with a bottom leading backward to said water compartment, that portion of the said water compartment below said bottom affording a shallow water receptacle, in combination with a dasher in the form of a shallow water receptacle pivotally mounted adjacent to said washing compartment and normally resting in a submerged position at the bottom of said washing compartment, the said dasher having a multiplicity of water compartments opening at the top of the dasher, and an operating rod attached to the free portion of said dasher and extended through the top of the tank.

7. In a washing machine, a tank having a water compartment, and a washing compartment with an inclined bottom leading backward to said water compartment, that portion of the said water compartment below said inclined bottom affording a shallow water receptacle, in combination with a dasher in the form of a shallow water receptacle pivotally mounted adjacent to said washing compartment and normally resting in a submerged position at the bottom of said washing compartment, the said dasher having a multiplicity of water compartments opening at the top of the dasher, and an operating rod attached to the free portion of said dasher and extended through the top of the tank, and a buffer spring affording a stop for limiting the movement of said dasher toward said washing compartment.

In testimony whereof I affix my signature in presence of two witnesses.

CHARLIE N. CLARK.

Witnesses:
HARRY D. KILGORE,
F. D. MERCHANT.